United States Patent [19]

Aoki

[11] Patent Number: 5,229,987
[45] Date of Patent: Jul. 20, 1993

[54] DOOR ARRANGEMENT FOR RECORD MEDIUM INSERTION OPENING

[75] Inventor: Yoshitaka Aoki, Tokyo, Japan
[73] Assignee: Sony Corporation, Tokyo, Japan
[21] Appl. No.: 748,652
[22] Filed: Aug. 22, 1991
[30] Foreign Application Priority Data Aug. 29, 1990 [JP] Japan .................................. 2-227751

[51] Int. Cl.$^5$ ............................................. G11B 17/04
[52] U.S. Cl. ............................... 369/77.1; 360/97.02
[58] Field of Search .................... 369/77.1, 77.2; 360/96.5, 99.06, 99.07, 97.02

[56] References Cited

U.S. PATENT DOCUMENTS

4,408,321 10/1983 Yamamura ........................... 369/77.2

Primary Examiner—Paul M. Dzierzynski
Assistant Examiner—Don Wong
Attorney, Agent, or Firm—Limbach & Limbach

[57] ABSTRACT

A door arrangement for a record medium insertion opening of a disk player or a like apparatus which is effective in reduction in size of the apparatus and allows the record medium insertion opening to be kept in a closed condition whether a record medium is loaded in position in the apparatus or not. The door arrangement includes a first door member for opening or closing one of two divisional portions of the record medium insertion opening provided by dividing the record medium insertion opening along a line extending in a longitudinal direction of the record medium insertion opening, a second door member for opening or closing the other one of the two divisional portions of the record medium insertion opening, and spring elements for urging the first and second door members to respective closing positions in which the first and second door members close the record medium insertion opening, respectively. The first and second door members are supported for individual forward and rearward pivotal motion around respective axes extending in parallel to and adjacent the opposite longitudinal edges of the record medium insertion opening.

5 Claims, 10 Drawing Sheets

DOOR ARRANGEMENT FOR RECORD MEDIUM INSERTION OPENING

BACKGROUND OF THE INVENTION

1. Field of the Invention

This invention relates to a novel door arrangement for a record medium insertion opening, and more particularly to a door arrangement for opening or closing a record medium insertion opening through which a record medium which is accommodated in a casing of a disk cartridge, a tape cassette or the like is loaded into such an apparatus as a disk player or a tape player.

2. Description of the Prior Art

Such an apparatus as a disk player or a tape player normally has a record medium insertion opening formed in a front panel thereof, and a cartridge or a cassette or the like is loaded in position into the apparatus through the insertion opening. Such insertion opening has a size a little greater than a sectional size of a cartridge or the like taken in a widthwise direction. Normally, a door member is provided to close, when no cartridge or the like is loaded in position in the apparatus, the record medium insertion opening to prevent possible admission of dust or the like into the apparatus through the insertion opening.

Figure 5A:
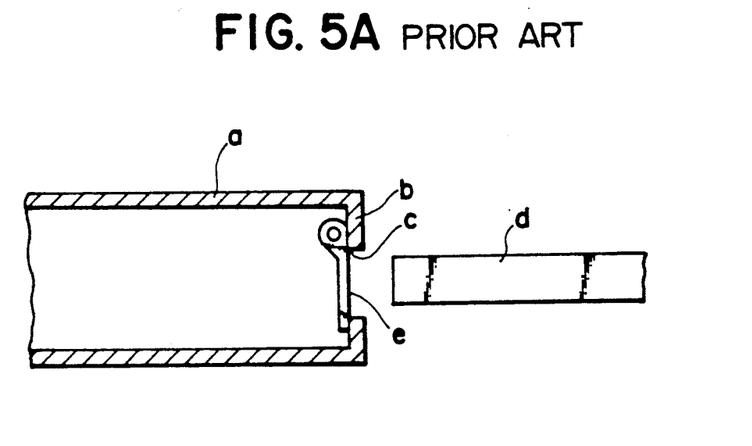
FIGS. 5(A) and 5(B) are sectional views showing an exemplary one of conventional door arrangements for a record medium insertion opening.
Figure 5B:
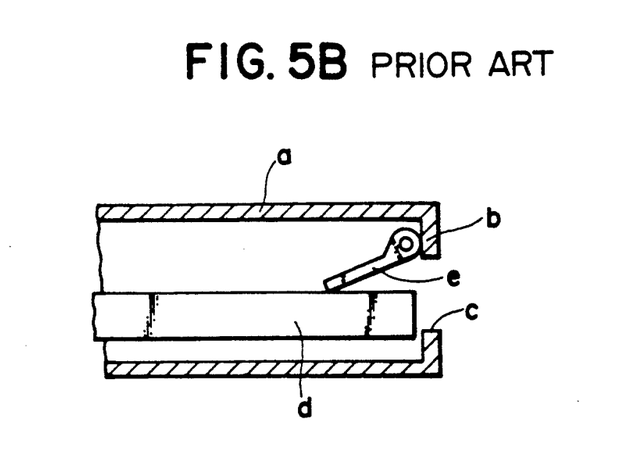

An exemplary one of conventional door arrangements for a record medium insertion opening is shown in FIGS. 5(A) and 5(B). Referring to FIGS. 5(A) and 5(B), the record medium door arrangement shown is applied to a magneto-optic disk player which includes a recording and reproducing apparatus a having a front panel b in which a horizontally elongated cartridge insertion opening c is formed. The cartridge insertion opening c is formed in a size a little greater than a sectional size of a cartridge d taken in a thicknesswise direction.

If such cartridge d is inserted into the recording and reproducing apparatus a through the cartridge insertion opening c, it is first held by a cartridge holding frame not shown disposed behind the cartridge insertion opening c and then moved down a little by a downward movement of the cartridge holding frame, whereafter a disk not shown therein is chucked in position by a chucking mechanism not shown.

A door member e is disposed so as to cover the cartridge insertion opening c from the rear side. The door member e is in the form of a plate having a size a little greater than the cartridge insertion opening c, and is supported at an upper side edge thereof for pivotal motion on a rear face of the front panel b adjacent an upper edge of the cartridge insertion opening c. The door member e is normally urged to close the cartridge insertion opening c by urging means not shown.

Insertion of a cartridge d into the recording and reproducing apparatus a proceeds in the following manner. In particular, the cartridge d will be moved toward the recording and reproducing apparatus a while it is held substantially in a horizontal condition. Thereupon, a rear side edge of the cartridge d pushes to pivot the door member e rearwardly to open the cartridge insertion opening c to allow the cartridge d to be inserted into the recording and reproducing apparatus a. The cartridge d inserted in the recording and reproducing apparatus a is held and moved down by the cartridge holding frame as seen from FIG. 5(B), and then a disk therein is chucked by the chucking mechanism.

When the cartridge d is inserted into the recording and reproducing apparatus a and held by the cartridge holding frame, a lower free end edge of the door member e lies on a front portion of an upper face of the cartridge d. Then, even after the cartridge holding frame is moved down, although the door member 3 is pivoted back a little in its closing direction, the free end edge of the door member e still lies on the upper face of the cartridge d and the cartridge insertion opening c is kept open.

Accordingly, when a removing operation for the cartridge d is performed, the cartridge d can be removed readily without being disturbed by the door member e. In particular, when the cartridge d is moved up from its chucked position, the door member e is pushed to pivot upwardly by the upper face of the cartridge d, and consequently, the door member e will not disturb removal of the cartridge d through the cartridge insertion opening c.

With such door member e for the cartridge insertion opening c as described above, since the cartridge insertion opening c is kept open while a cartridge d is loaded in position in the recording and reproducing apparatus a, there is a problem that dust or some other foreign articles may be admitted into the recording and reproducing apparatus a.

One of possible solutions to such problem is to form a door member in a size substantially equal to or a little smaller than a cartridge insertion opening and dispose such door member in a suspended condition on an upper longitudinal edge of the cartridge insertion opening.

Figure 6A:
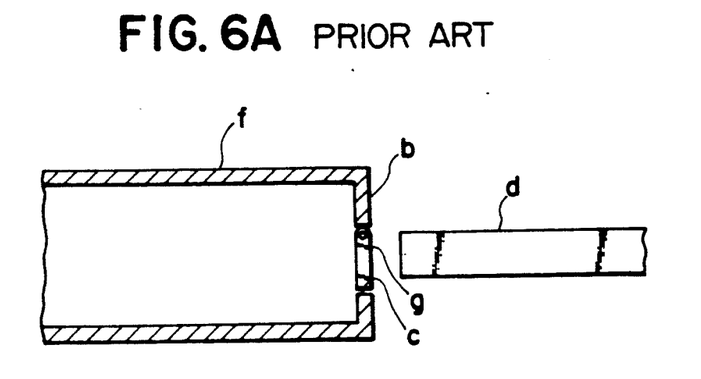
FIGS. 6(A) to 6(C) are similar views but showing another exemplary one of conventional door arrangement for a record medium insertion opening.

FIG. 6(A) shows another recording and reproducing apparatus which includes such a door member for a cartridge insertion opening as described just above. Referring to FIG. 6(A), the recording and reproducing apparatus shown is generally denoted at f and includes a door member g having a size substantially equal to or a little smaller than a cartridge insertion opening c. The door member g is supported for forward and rearward pivotal motion around an axis extending along an upper longitudinal edge of the cartridge insertion opening c. The door member g is normally urged by urging means not shown to a closing position in which it closes the cartridge insertion opening c.

When a cartridge d is inserted into the recording and reproducing apparatus f, the door member g for the cartridge insertion opening c is pushed to pivot rearwardly by a rear end portion of the cartridge d to open the cartridge insertion opening c, but after the cartridge d is inserted fully into the recording and reproducing apparatus f, a free end edge of the door member g is disengaged from the cartridge d to allow the door member g to be returned to its closing position by the urging means.

On the other hand, when the cartridge d is removed, a front end portion of the cartridge d pushes to pivot the door member g forwardly to open the cartridge insertion opening c, and after the cartridge d is removed through the cartridge insertion opening c, the door member g is returned to its closing position by the urging means.

With such door member g for the cartridge insertion opening c as described above, whether or not a cartridge d is inserted in the recording and reproducing apparatus f, the cartridge insertion opening c can be held in a closed condition, and consequently, possible admission of dust or some other foreign articles into the recording and reproducing apparatus f can be prevented.

Figure 6B:
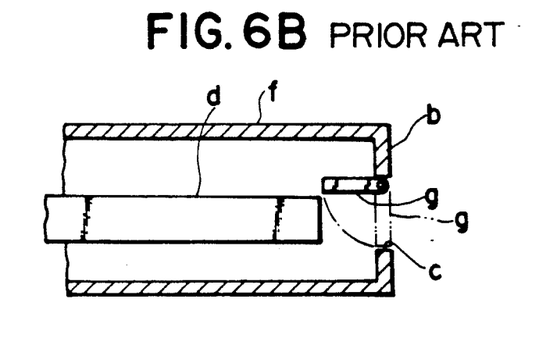
Figure 6C:
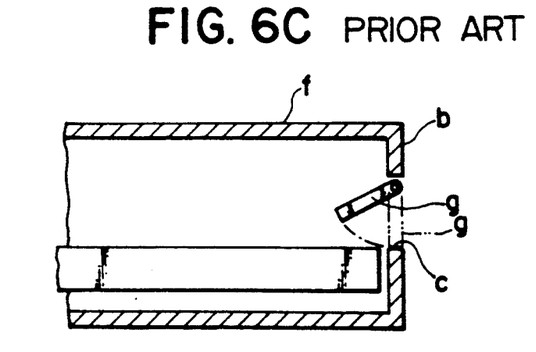

With the door arrangement for a recording and reproducing apparatus shown in FIG. 6, however, in order to allow the door member g to be returned to its closing position after a cartridge d is inserted into the recording and reproducing apparatus f, it is necessary either to draw the cartridge d to a position spaced sufficiently rearwardly away from the front panel b as seen in FIG. 6(B) or to move down the cartridge d to another position at which the cartridge d is spaced away from the free end edge of the door member g as seen in FIG. 6(C). In either case, there is a problem that the recording and reproducing apparatus f must have a size sufficient to allow such rearward or downward movement of a cartridge d.

After all, the door arrangement for a record medium insertion opening shown in FIG. 5(A) is disadvantageous in that, while the distance between a cartridge d in its fully inserted position and the front panel b or the amount of movement of a cartridge d to its chucked position need not be very great and accordingly the recording and reproducing apparatus a is effective in reduction in size, the cartridge insertion opening c is kept in an open condition when a cartridge d is loaded in position in the recording and reproducing apparatus a. On the other hand, the door arrangement for a record medium insertion opening shown in FIG. 6(A) is disadvantageous in that, while the cartridge insertion opening c can be kept in a closed condition whether a cartridge d is loaded in position in the recording and reproducing apparatus f or not, it is not effective in reduction in size.

SUMMARY OF THE INVENTION

It is an object of the present invention to provide a door arrangement for a record medium insertion opening of an apparatus which is effective in reduction in size of the apparatus and allows the record medium insertion opening to be kept in a closed condition whether a record medium is loaded in position in the apparatus or not.

In order to attain the object, according to the present invention, there is provided a door arrangement for opening or closing a substantially rectangular record medium insertion opening formed in a front panel of an apparatus, which comprises a first door member for opening or closing one of two divisional portions of the record medium insertion opening provided by dividing the record medium insertion opening along a line extending in a longitudinal direction of the record medium insertion opening, a second door member for opening or closing the other one of the two divisional portions of the record medium insertion opening, and first and second urging means for urging the first and second door members to respective closing positions in which the first and second door members close the record medium insertion opening, respectively, the first and second door members being supported for individual forward and rearward pivotal motion around respective axes extending in parallel to and adjacent the opposite longitudinal edges of the record medium insertion opening.

With the door arrangement for a record medium insertion opening, not only when no record medium is loaded in position in the apparatus, but also when a record medium is loaded in position in the apparatus, the record medium insertion opening can be kept in its closed condition. Consequently, possible inadvertent admission of dust or some other foreign articles into the apparatus through the record medium insertion opening can be prevented. Besides, the amount of movement of a cartridge to its loaded position after the cartridge is inserted fully into the apparatus through the record medium insertion opening need not be increased, and consequently, the door arrangement is effective for reduction in overall size of the apparatus.

The above and other objects, features and advantages of the present invention will become apparent from the following description and the appended claims, taken in conjunction with the accompanying drawings in which like parts or elements are denoted by like reference characters.

DETAILED DESCRIPTION OF THE PREFERRED EMBODIMENTS

Figure 1:
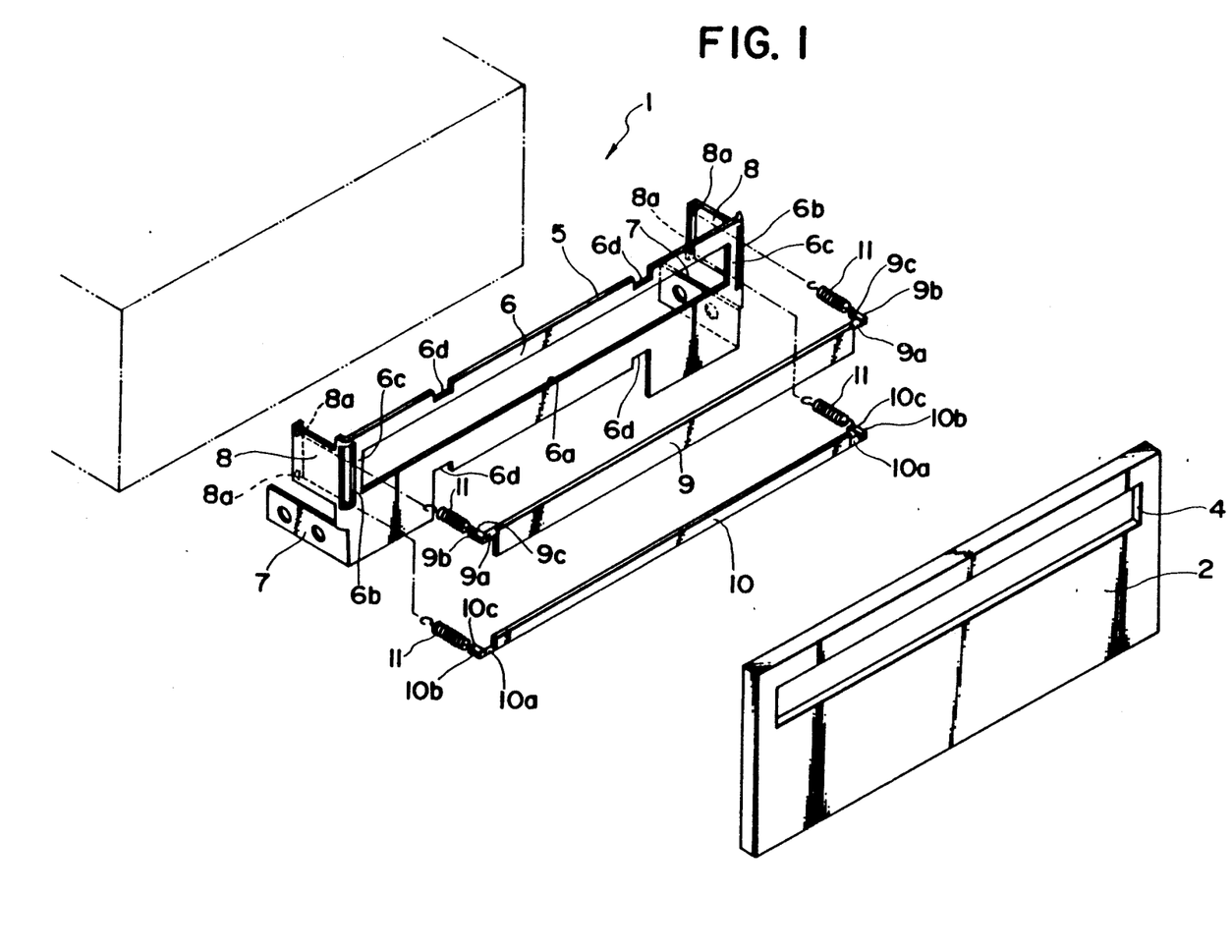
FIG. 1 is a perspective view of a door arrangement for a cartridge insertion opening for insertion of a cartridge for a magneto-optic disk into a disk player showing a first preferred embodiment of the present invention.
Figure 2:
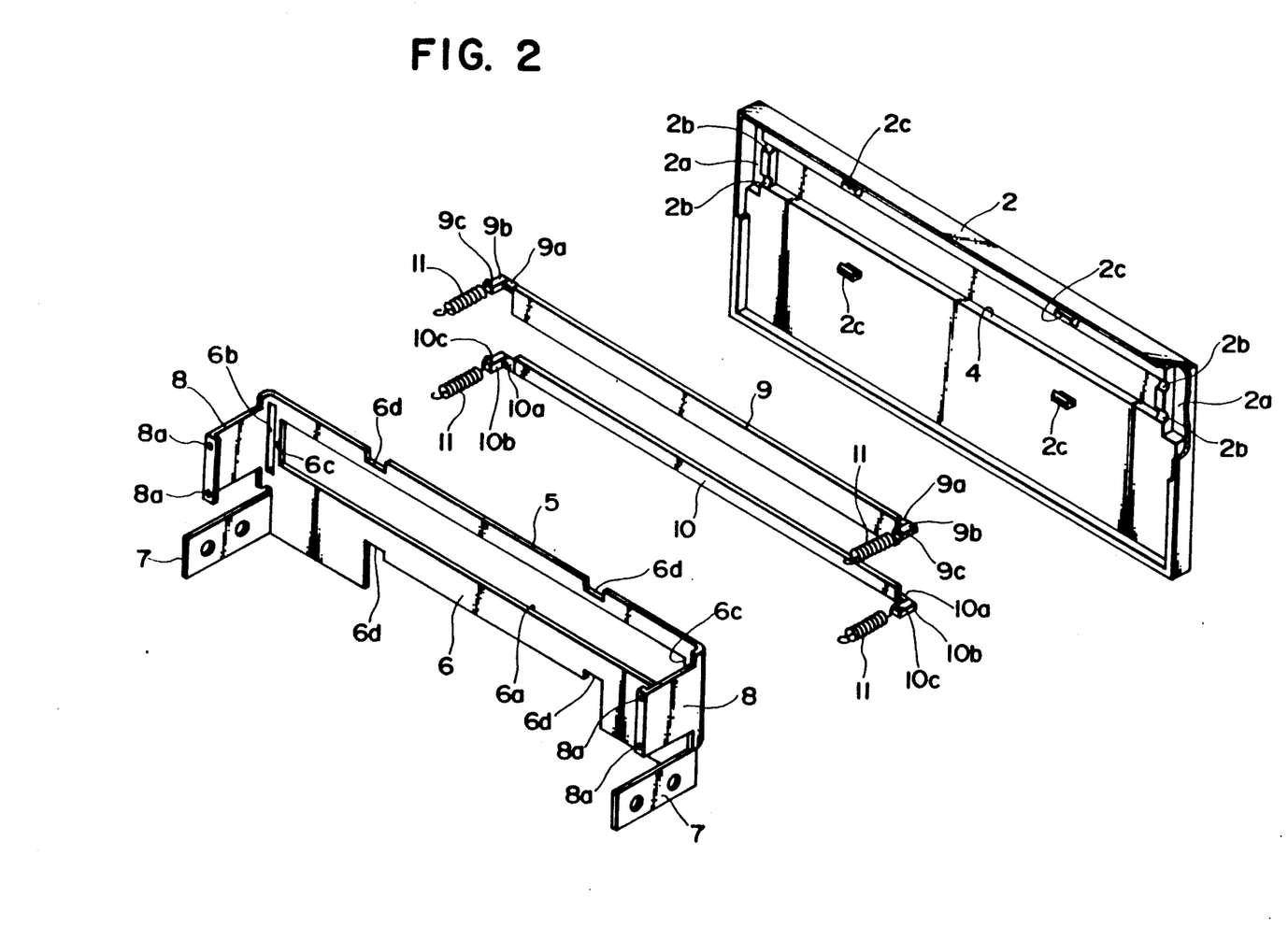
FIG. 2 is a fragmentary perspective view of the door arrangement shown in FIG. 1.

Referring first to FIGS. 1 and 2, there is shown a magneto-optical disk player in which a door arrangement for a record medium insertion opening according to the present invention is incorporated. The magneto-optic disk player is generally denoted at 1 and includes a front panel 2 in which a horizontally elongated substantially rectangular cartridge insertion opening 4 for inserting a cartridge 3 into the the magneto-optical disk player 1 therethrough is formed.

As particularly seen in FIG. 2, the front panel 2 has a pair of vertically elongated relief recesses 2a formed on a rear face thereof in an outwardly spaced relationship from the opposite left and right side edges of the cartridge insertion opening 4. The front panel 2 has two pairs of bearing recesses 2b formed on the rear face thereof with the same depth as the relief recesses 2a such that they communicate the relief recesses 2a with the four corners of the cartridge insertion opening 4.

The magneto-optic disk player 1 further includes a front chassis 5 which forms a front face portion of a chassis not shown. The front chassis 5 is mounted on a body not shown of the magneto-optic disk player 1, and the front panel 2 is mounted on a front face of the front chassis 5.

The front chassis 5 is formed as a unitary member from a metal plate material having a main portion 6 in the form of a plate, a pair of mounting tabs 7 extending rearwardly from the opposite ends of a lower edge portion of the main portion 6, and a pair of spring anchoring tabs 8 extending rearwardly from the opposite ends of an upper portion of the main portion 6.

The front chassis 5 has an insertion opening 6a formed in the main portion 6 thereof in an opposing relationship to the cartridge insertion opening 4 of the front panel 2. The insertion opening 6a has a same shape and a same size as the cartridge insertion opening 4. The front chassis 5 has a pair of relief holes 6b formed in the main portion 6 thereof in an opposing relationship to the relief recesses 2a of the front panel 2. Also the relief holes 6b have a same shape and a same size as the relief recesses 2a. Thus, portions 6c of the front chassis 5 between the relief holes 6b and the insertion opening 6a cover the bearing recesses 2b of the front panel 2 from the rear when the front panel 2 is mounted on the front chassis 5. Such portions 6c will be hereinafter referred to as shaft holding pieces.

A pair of spring anchoring holes 8a are formed in a vertically spaced relationship at each of a pair of rearwardly bent rear end portions of the spring anchoring tabs 8 of the front chassis 5.

An upper door member 9 and a lower door member 10 are provided for opening or closing upper and lower ones, respectively, of two divisional portions of the cartridge insertion opening 4 of the front panel 2 obtained by dividing the cartridge insertion opening 4 along a line extending in a longitudinal direction of the cartridge insertion opening 4, that is, in a horizontal direction. Accordingly, the upper and lower door members 9 and 10 have a total size substantially equal to a size of the cartridge insertion opening 4.

Here, the upper door member 9 has a vertical dimension a little greater than the lower door member 10 as hereinafter described more in detail.

The upper door member 9 has a pair of support shaft portions 9a formed integrally on and extending outwardly from the opposite left and right ends of an upper edge portion thereof. The support shaft portions 9a have a length equal to or a little greater than the length of the bearing recesses 2b of the front panel 2 and have an outer diameter a little smaller than the depth of the bearing recesses 2b. A spring anchoring lug 9b is formed integrally on and extends rearwardly from an outer end of each of the support shaft portions 9a, and has a spring anchoring hole 9c formed at a rear end portion thereof.

The lower door member 10 has a pair of support shaft portions 10a formed integrally on and extending outwardly from the opposite left and right ends of a lower edge portion thereof. The support shaft portions 10a have a length equal to or a little greater than the length of the bearing recesses 2b of the front panel 2 and have an outer diameter a little smaller than the depth of the bearing recesses 2b. A spring anchoring lug 10b is formed integrally on and extends rearwardly from an outer end of each of the support shaft portions 10a, and has a spring anchoring hole 10c formed at a rear end portion thereof.

The door members 9 and 10 are supported on the front panel 2 to open or close the cartridge insertion opening 4 in the following manner.

In particular, the support shaft portions 9a and 10a of the door members 9 and 10 are first positioned in the bearing recesses 2b of the front panel 2 such that the door members 9 and 10 close the cartridge insertion opening 4.

Then, two pairs of arresting pawls 2c formed on the rear face of the front panel 2 are engaged with engaging recesses 6d formed along upper and lower edges of the main portion 6 of the front chassis 5 to mount the front panel 2 on the front face of the main portion 6 of the front chassis 5. In this instance, the front panel 2 is positioned such that the cartridge insertion opening 4 thereof coincides forwardly with the insertion opening 6a of the main portion 6 of the front chassis 5 while the relief recesses 2a thereof are positioned rearwardly of the relief holes 6b and besides the bearing recesses 2b are covered by the shaft bearing pieces 6c from rearwardly.

The door members 9 and 10 are thus supported for forward and rearward pivotal motion on and with respect to the front panel 2 with the support shaft portions 9a and 10a thereof held between the shaft holding pieces 6c of the main portion 6 of the front chassis 5 and the bearing recesses 2b of the front panel 2.

Two pairs of tension coil springs 11 extend between the spring anchoring holes 9c and 10c of the door members 9 and 10 and individually corresponding ones of the spring anchoring holes 8a of the spring anchoring pieces 8 of the front chassis 5. The tension coil springs 11 resiliently act upon the spring anchoring lugs 9b and 10b of the door members 9 and 10 to normally urge the door members 9 and 10 to individual positions wherein the spring anchoring lugs 9b and 10b thereof are directed rearwardly and the door members 9 and 10 close the cartridge insertion opening 4.

A cartridge 3 is loaded in position into the magneto-optic disk player 1 in the following manner.

Figure 3A:
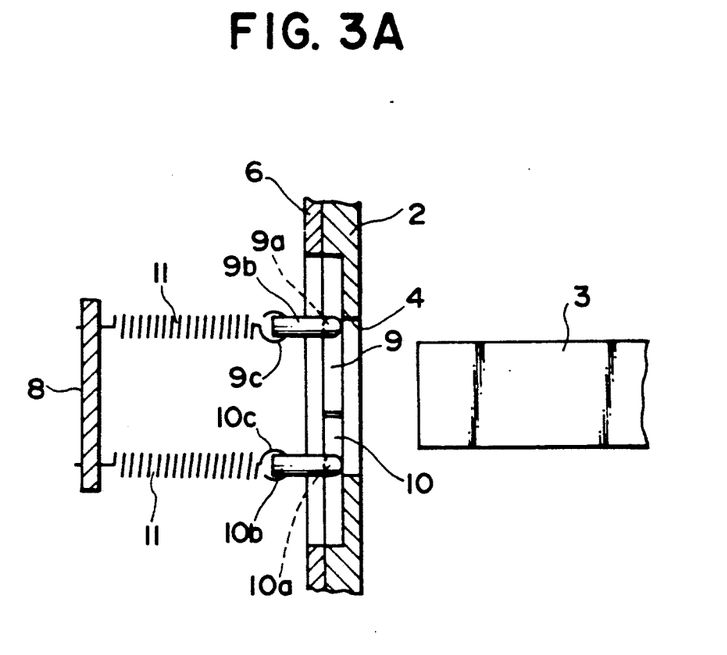
FIGS. 3(A) to 3(G) are enlarged sectional views of the door arrangement of FIG. 1 showing different successive steps of a procedure of inserting and removing a cartridge into and from the disk player.

First, the cartridge 3 is positioned in a substantially horizontal condition in front of the cartridge insertion opening 4 as seen in FIG. 3(A).

Figure 3B:
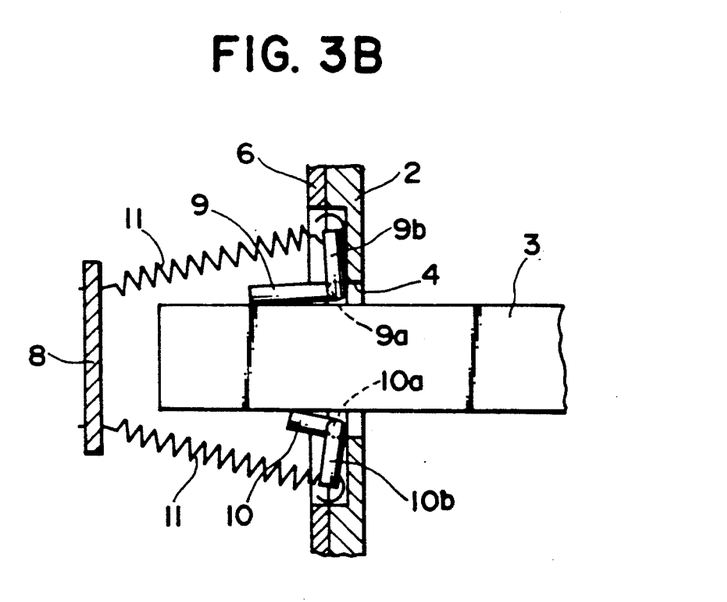

Then, the cartridge 3 is moved rearwardly into the cartridge insertion opening 4. Thereupon, the cartridge 3 pushes to pivot the upper and lower door members 9 and 10 rearwardly. In this instance, since the spring anchoring lugs 9b and 10b of the door members 9 and 10 are pivoted together with the door members 9 and 10, respectively, the distances from the spring anchoring tabs 8 of the front chassis 5 to the spring anchoring lugs 9b and 10b are increased thereby to expand the tension coil springs 11 as seen from FIG. 3(B).

Figure 3C:
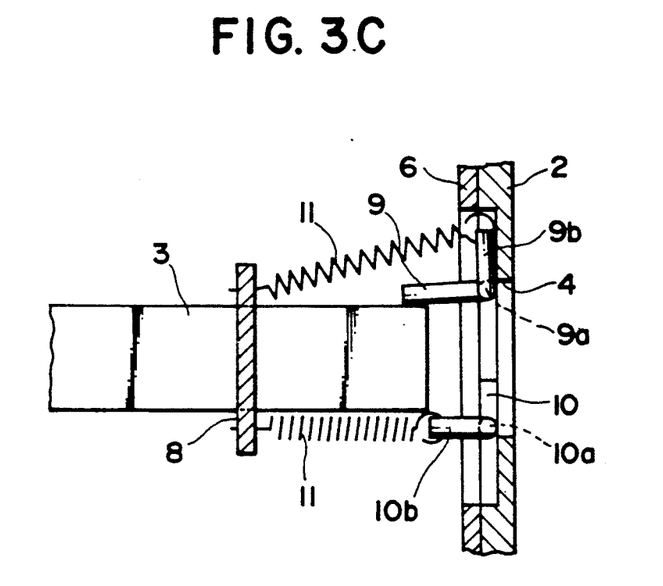

Then, immediately after the cartridge 3 is horizontally inserted fully into the magneto-optic disk player 1, an upper or free end of the lower door member 10 is first spaced away from a lower face of the cartridge 3 to allow the lower door member 10 to be pivoted back to its closing position as seen in FIG. 3(C) by the urging force of the associated tension coil springs 11. It is to be noted that, when the cartridge 3 is inserted to some extent into the magneto-optic disk player 1 through the cartridge insertion opening 4, the cartridge 3 is drawn into the magneto-optic disk player 1 to its fully inserted position by a cartridge drawing in mechanism not shown and received by a cartridge holding frame not shown.

Figure 3D:
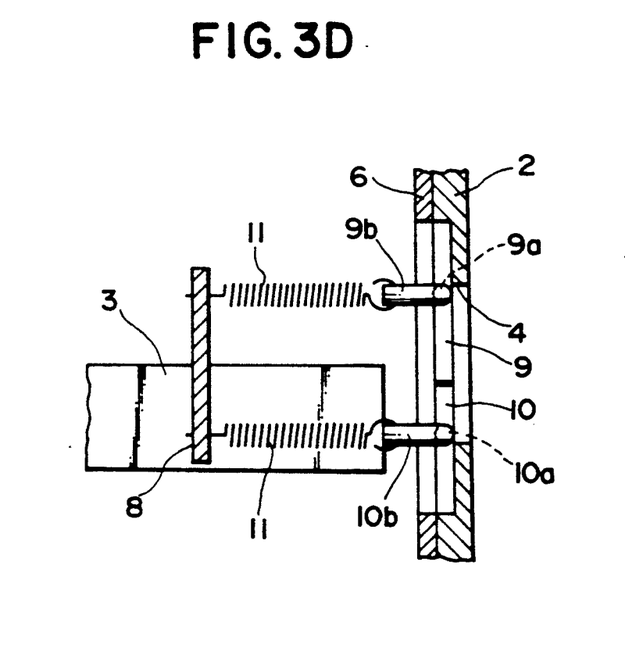

The cartridge 3 thus held on the cartridge holding frame is subsequently moved down by a lowering movement of the cartridge holding frame, and a disk in the cartridge 3 is chucked by a chucking mechanism not shown, thereby completing loading of the cartridge 3 in position into the magneto-optic disk player 1. Upon such downward movement, a lower free end of the upper door member 9 is spaced away from an upper face of the cartridge 3 to allow the door member 9 to be pivoted back to its closing position as seen in FIG. 3(D) by the urging force of the associated tension coil springs 11.

The cartridge 3 loaded in position into the magneto-optic disk player 1 in this manner is removed in the following manner.

Figure 3E:
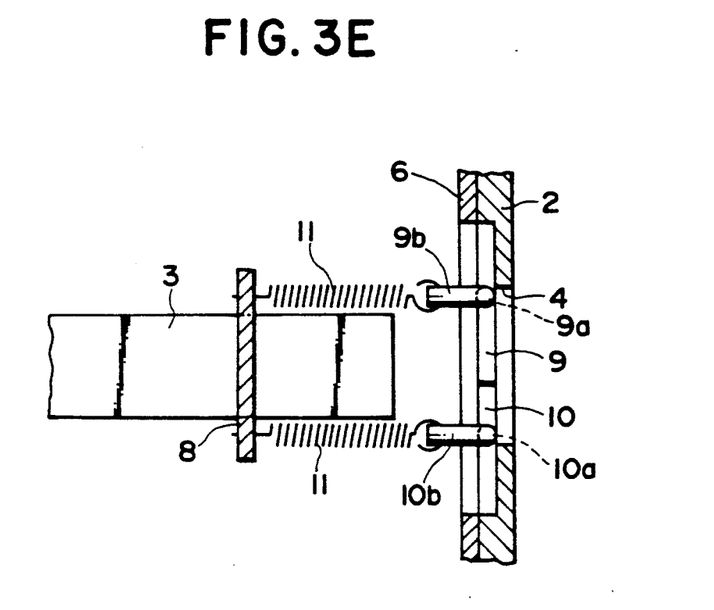

First, the disk of the disk cartridge 3 is released from chucking by the chucking mechanism and the cartridge holding frame is moved up as seen in FIG. 3(E) in response to an external removing instruction provided to the magneto-optic disk player 1.

Then, the cartridge 3 is pushed to move forwardly from the cartridge holding frame by a pushing out mechanism not shown. Thereupon, the door members 9 and 10 are pushed to pivot forwardly by a front end of the cartridge 3 to open the cartridge insertion opening 4 as seen in FIG. 3(F).

In this instance, the spring anchoring lugs 9b and 10b of the door members 9 and 10 are pivoted integrally with the door members 9 and 10, respectively, and accordingly, the distances from the spring anchoring tabs 8 of the front chassis 5 to the spring anchoring lugs 9b and 10b are increased thereby to expand the associated tension coil springs 11.

Figure 3F:
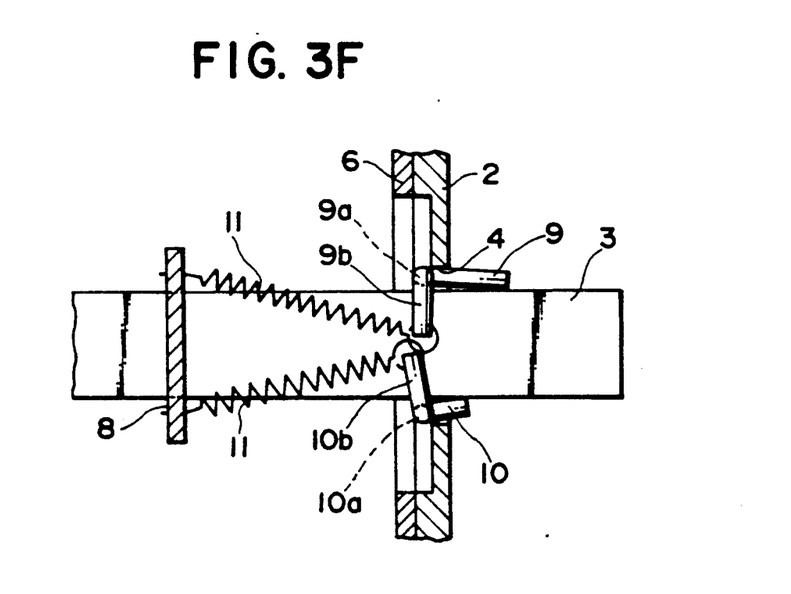
Figure 3G:
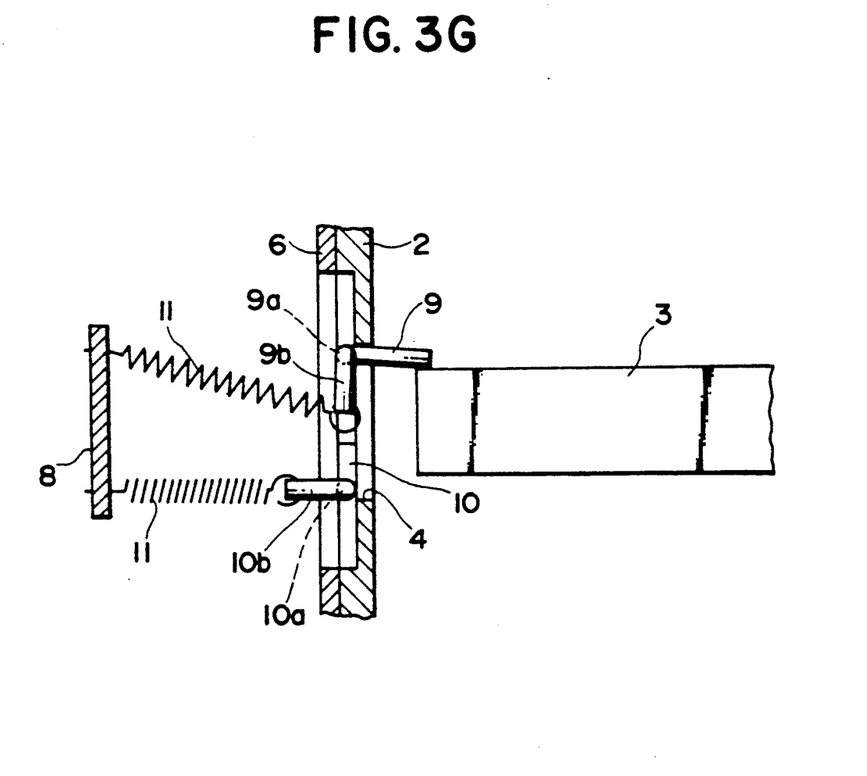

Then, in the condition shown in FIG. 3(F), the cartridge 3 will be grasped and pulled out forwardly from the magneto-optic disk player 1 by hand. Thereupon, the free end of the lower door member 10 is spaced away from the lower face of the cartridge 3 to allow the lower door member 10 to be pivoted by the urging force of the associated tension coil springs 11 to its closing position as seen in FIG. 3(G).

Then, when the cartridge 3 is further pulled out forwardly, now the free end of the upper door member 9 is spaced away from the upper face of the cartridge 3 to allow the upper door member 9 to be pivoted by the urging force of the associated tension coil springs 11 to its closing position as seen in FIG. 3(A).

It is to be noted that the vertical dimension of the lower door member 10 is determined from a relationship of the lower door member 10 to the fully inserted position of a cartridge shown in FIG. 3(C), and if such vertical dimension is decreased, then the amount of movement to the fully inserted position can be decreased and consequently the entire apparatus can be reduced in size. Meanwhile, the vertical dimension of the upper door member 9 is determined from a relationship of the same to the chucked position of the cartridge 3 shown in FIG. 3(D) at which a disk in the cartridge 3 is chucked by the chucking mechanism not shown. Thus, if the vertical dimension of the upper door member 9 is decreased, then the amount of downward movement to the chucked position can be reduced and consequently the entire apparatus can be reduced in size.

On the other hand, since the sum of the vertical dimensions of the upper and lower door members 9 and 10 is substantially equal to the vertical dimension of the cartridge insertion opening 4, the vertical dimensions of the upper and lower door members 9 and 10 are determined by the fully inserted position and the chucked position of a cartridge.

Referring now to FIGS. 4(A) to 4(D), there is shown another magneto-optic disk player in which another door arrangement for a record medium insertion opening according to the present invention is incorporated. The magneto-optic disk player is generally denoted at 1A and is a modification to the magneto-optic disk player 1 in that the door arrangement is only different in shapes of free end edges of upper and lower door members thereof from that of the magneto-optic disk player 1.

Figure 4A:
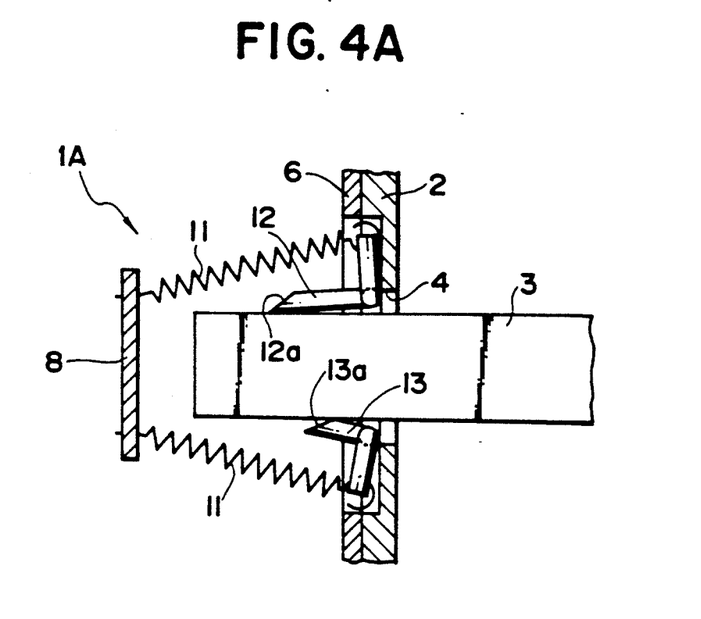
FIGS. 4(A) to 4(D) are similar views but showing successive steps of a procedure of inserting and removing a cartridge into another disk player according to a second preferred embodiment of the present invention.
Figure 4B:
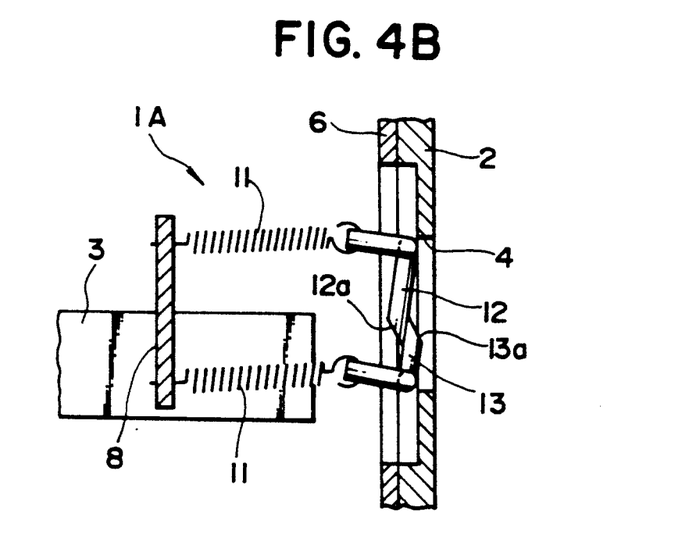
Figure 4C:
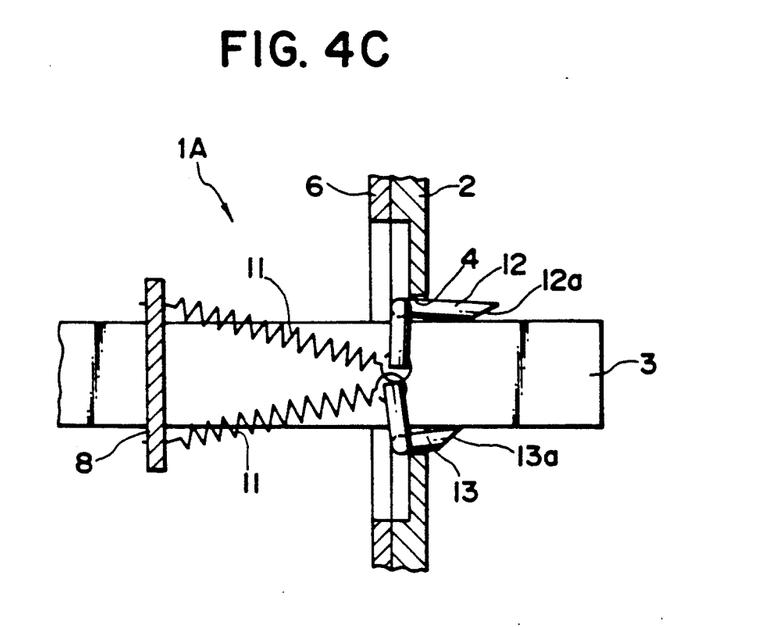

In particular, the magneto-optic disk player 1A includes an upper door member 12 having a free end 12a which is formed so as to have an inclined face which is directed obliquely rearwardly downwards when the upper door member 12 is in its normal closing position.

Meanwhile, a lower door member 13 has a free end 13a which is formed so as to have an inclined face which is directed obliquely forwardly upwards when the lower door member 13 is in its normal closing position. Thus, when both of the upper and lower door members 12 and 13 are in their respective closing positions, the inclined faces 12a and 13a thereof contact with each other.

The inclined face 13a at the free end of the lower door member 13 is colored in a different color which can be identified from a color of front faces of the door members 12 and 13 such as, for example, red.

It is to be noted that the upper door member 12 has a vertical dimension a little greater than the vertical dimension of the lower door member 13 similarly as the door arrangement of the first embodiment described hereinabove.

If a cartridge 3 is inserted into the cartridge opening 4 of the magneto-optic disk player 1A, then the door members 12 and 13 are operated to open and then close the cartridge insertion opening 4 as seen in FIGS. 4(A) to 4(D) in a similar manner as the door members 9 and 10 in the first embodiment described hereinabove. Then, when the door members 12 and 13 are pivoted back to the respective closing positions after a cartridge 3 is inserted to the fully inserted position, the lower door member 13 is returned to the closing position earlier than the upper door member 12, and consequently, the inclined face 13a at the free end of the lower door member 13 is exposed forwardly of the magneto-optic disk player 1A so that the different color can be visually observed from the front.

Figure 4D:
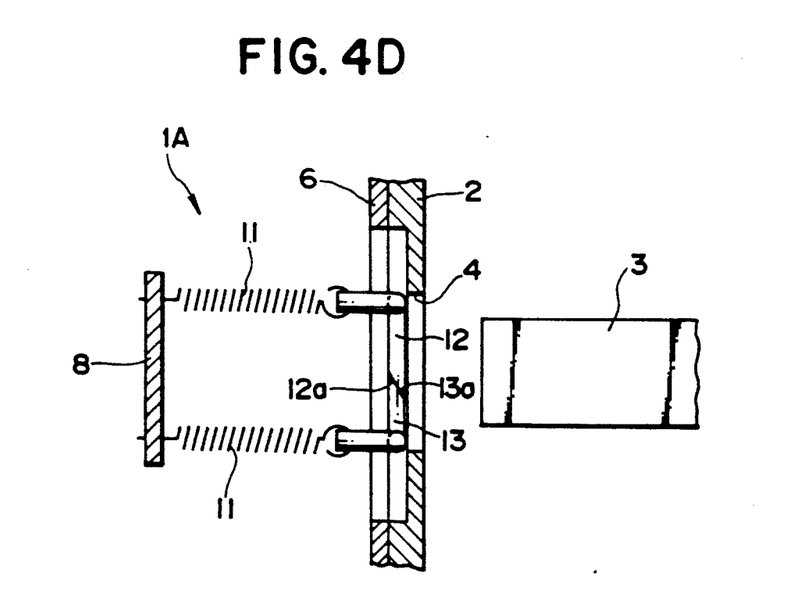

Then, when the cartridge 3 is removed, the lower door member 13 is returned from its opening position to its closing position earlier than the upper door member 12, and consequently, after the upper and lower door members 12 and 13 are returned to the closing positions, the upper door member 12 is positioned forwardly of the lower door member 13 as seen in FIG. 4(D). Consequently, the inclined face 13a at the free end of the lower door member 13 is not exposed forwardly and accordingly the different color thereof is not visually observed from the front. In this manner, whether or not a cartridge 3 is loaded in position in the magneto-optic disk player 1A can be visually judged readily depending upon whether or not the color of the inclined face 13a at the free end of the lower door member 13 can be visually observed.

It is to be noted that, while in the embodiments described above the present invention is described applied to a door arrangement for a cartridge insertion opening of a magneto-optic disk player, the application of the present invention is not limited to a door arrangement for a cartridge insertion opening of such specific apparatus, but the present invention may be applied to a door arrangement, for example, for a tape cassette insertion opening of a video tape recorder or for a cartridge insertion opening of a floppy disk drive unit.

Having now fully described the invention, it will be apparent to one of ordinary skill in the art that many changes and modifications can be made thereto without departing from the spirit and scope of the invention as set forth herein.

What is claimed is:

1. A door arrangement for opening or closing a substantially rectangular record medium insertion opening formed in a front panel of an apparatus, said record medium insertion opening having a longitudinal direction, and consisting of a first opening portion and a second opening portion separated from the first opening portion by a line extending along the longitudinal direction, comprising:

a first door member pivotally mounted to the front panel for forward and rearward pivotal motion relative to the front panel in a position for opening or closing the first opening portion;

a second door member pivotally mounted to the front panel for forward and rearward pivotal motion relative to the front panel in a position for opening or closing the second opening portion; and first and second urging means for urging said first and second door members to respective closing positions in which said first and second door members close said first opening portion and said second opening portion, respectively, wherein the first and second urging means urge the first door and the second door into said closing positions after the first door and the second door have been displaced rearward by a cartridge passing rearward completely through the record medium insertion opening, and wherein the first and second urging means urge the first door and the second door into said closing positions after the first door and the second door have been displaced forward by a cartridge passing forward completely through the record medium insertion opening.

2. The door arrangement of claim 1, wherein each of said first and second door members is in the form of a plate having a pair of shaft portions extending outwardly from the opposite ends of a longitudinal edge thereof and is supported from the front panel at said shaft portions thereof for pivotal motion around a common axis of said shaft portions.

3. The door arrangement of claim 2, wherein each of said first and second door members has a pair of lugs extending perpendicularly to a plane of the plate thereof from said shaft portions, and said first and second urging means are connected to ends of the lugs of said first and second door members, respectively, to normally maintain the lugs perpendicularly to a plane of said first and second door members in the closing positions.

4. The door arrangement of claim 1, wherein said first door member has a lateral dimension slightly greater than said second door member.

5. The door arrangement of claim 4, wherein complementarily inclined faces are formed at free ends of said first and second door members such that the inclined face of said second door member is directed obliquely outwardly and is colored in a different color from that of outer faces of said first and second door members.

* * * * *